(12) United States Patent
Umehara et al.

(10) Patent No.: US 6,547,842 B1
(45) Date of Patent: Apr. 15, 2003

(54) POLISHING MATERIAL, GRINDING PARTICLE BODY FOR ABRASION-GRINDING, METHOD FOR PRODUCING A POLISHING MATERIAL, AND METHOD FOR POLISHING OR GRINDING, AND POLISHING APPARATUS

(75) Inventors: Noristugu Umehara, 102, 46-3, Besho 2-chome, Hachioji, Tokyo 192-0363 (JP); Kazuya Edamura, Tokyo (JP); Isao Shibata, Yamanashi (JP)

(73) Assignees: Nisca Corporation, Yamanashi (JP); Noristugu Umehara, Tokyo (JP); New Technology Management Co., Ltd., Tokyo (JP)

( * ) Notice: Subject to any disclaimer, the term of this patent is extended or adjusted under 35 U.S.C. 154(b) by 0 days.

(21) Appl. No.: 09/591,507

(22) Filed: Jun. 12, 2000

(30) Foreign Application Priority Data

Jun. 10, 1999 (JP) .............................................. 11-164369

(51) Int. Cl.⁷ ............................................... B24B 31/116
(52) U.S. Cl. .............................. 51/305; 51/307; 51/309; 51/289; 51/283; 252/62.52; 252/74; 252/570; 252/572

(58) Field of Search .......................... 51/305, 307, 309, 51/289, 283; 252/62.52, 572, 570, 74

(56) References Cited

U.S. PATENT DOCUMENTS

| | | | | |
|---|---|---|---|---|
| 2,417,800 A | * | 3/1947 | Weisser | 51/304 |
| 3,645,048 A | * | 2/1972 | MacClaren | 451/36 |
| 4,098,253 A | * | 7/1978 | Bonnice | 125/11.01 |
| 4,537,604 A | * | 8/1985 | Dawson | 51/298 |
| 4,541,843 A | * | 9/1985 | Elbel et al. | 51/293 |
| 4,785,587 A | * | 11/1988 | Reich et al. | 451/548 |
| 5,577,948 A | * | 11/1996 | Kordonsky et al. | 451/104 |
| 5,578,238 A | * | 11/1996 | Weiss et al. | 252/62.51 R |
| 5,795,212 A | * | 8/1998 | Jacobs | 451/36 |
| 6,299,516 B1 | * | 10/2001 | Tolles | 451/287 |

* cited by examiner

Primary Examiner—C. Melissa Koslow
(74) Attorney, Agent, or Firm—Armstrong, Westerman & Hattori, LLP

(57) ABSTRACT

This invention provides a polishing apparatus using a polishing material freely varying its shape in a tri-dimensional space in accordance with the shape of a work, and capable of polishing a narrow, recessed surface inaccessible to human hands or a tool, and a polishing method used therefor.

15 Claims, 9 Drawing Sheets

FIG.I

INDUCTOR PLATE X

POLISHING MATERIAL, GRINDING PARTICLE BODY FOR ABRASION-GRINDING, METHOD FOR PRODUCING A POLISHING MATERIAL, AND METHOD FOR POLISHING OR GRINDING, AND POLISHING APPARATUS

BACKGROUND OF THE INVENTION

1. Field of the Invention

The present invention relates to a polishing material comprising a fluid containing grinding particles, a grinding material (particularly grinding particle body for abrasion-grinding in which reversible phase transition between liquid and solid states is possible at normal temperatures (0–65° C.)), polishing method, and a polishing apparatus with which to move a polishing material relative to a work thereby giving a polish to the work.

2. Prior Art

With the rapid development of technological innovation, demand for high quality industrial products becomes acute; and processed objects (to be referred to as "work" hereinafter) such as industrial products or parts requiring abrasion-polishing or abrasion-grinding come to have a complicated shape which often requires finest and minutest precision for processing. However, the last finishing process of such a work where the finest surface polishing or the maximum precision of groundwork is required is generally achieved even today by human hands. Therefore, if this manually achieved process could be substituted for by a machine-operated process or a process enabling the reduction of labor cost, it would be beneficial because it would reduce cost involved in processing, or time required for the process. Further, the manually-operated process has a precision limit in the finest surface polishing no matter how skilled the hands may be.

To meet such a situation, studies on a method for enabling the high-precision surface polishing of a work using a soft lapping stone have been continued. This is a polishing method using a polishing stone comprising of a soft polymer material such as polyvinyl acetal, sodium alginate or the like, as a bonding agent. The polishing based on soft lapping like this has been mainly used for the fine surface polishing of a silicone wafer required for fabrication of an integrated circuit.

The inventors of this Application proposed a polishing method which consists of using a magnetic fluid containing grinding particles whose orientation can be controlled by a magnetic field, immersing a work in the magnetic fluid, and vibrating or rocking the magnetic fluid with respect to the work while a magnetic field with a specified intensity being applied to the fluid. The polishing method based on the use of a magnetic fluid includes, for example, those disclosed by Japanese Patent Laid-Open Nos. 1-135466, 4-336954 and 4-41173.

However, with such a polishing method, the strains given by grinding particles on the surface of work are so small that their polishing effect is weak, because the polishing material is a highly fluidic liquid. Because of this, this method is not suitable for a process requiring abrasion-grinding, or a process requiring coarse polishing introduced before fine polishing, although it may be utilized for the uniform surface polishing of the entire surface of a work during the final process.

This conventional technique uses a magnetic fluid, puts it under a magnetic field having a specified intensity, and polishes a work while controlling the orientation of grinding stone particles, but poses a problem when used for polishing a work requiring high-precision polishing in a direction in a tri-dimensional space.

To meet this inconvenience, the present inventors paid attention to the fact that a fluidic abrasive containing grinding store can vary its form freely in accordance with the shape of the surface to be ground, and can polish even the surface of a cleft or a narrow, recessed surface rejecting the access of human hands or a tool. However, because the fluidic abrasive exerts a less pressure against the surface of a work than a solid abrasive that is otherwise the same in configuration, it is not suitable for rapid grinding or coarse polishing. Therefore, they proposed a polishing material which combines the merits of both fluidic and solid abrasives, that is, a material capable both of polishing a surface having a complicated shape, and of achieving highly effective polishing. Use of this proposed polishing material consists of injecting fluidic abrasive stone containing grinding particles into a work, solidifying it at a low temperature, and moving the thus obtained solid abrasive relative to the surface of work, thereby achieving polishing or grinding of the latter. The conventional abrasive stone includes metal bond abrasives, resin bond abrasives, electrical bond abrasives, gelatin texture abrasives, etc. However, because they have been prepared to take a certain shape before they are used, it is difficult to freely vary their shape in accordance with the surface to which they are applied.

Actually, the method for polishing or grinding a work on the basis of a mechanical force imposed by a solid J abrasive with a specific shape is limited to abrasion grinding or coarse polishing because it does not allow high precision polishing. Further, polishing with an apparatus incorporating a solid abrasive has been conventionally used for polishing of a two-dimensional surface and hardly used for polishing of a surface having a tridimensional expanse because of the structural rigidity inherent to such a solid abrasive.

Further, polishing by the method of immersing a fluid containing grinding particles to the surface of a work to be polished, and moving the fluid with respect to the surface thereby to give a polish on the surface has a very weak effect, because the polishing material is a highly fluidic liquid, and the contact pressure exerted by the grinding particles against the surface to be polished is small. Because of this, this method is not suitable for a process requiring abrasion-grinding, or a process requiring coarse polishing introduced before fine polishing, although it may be utilized for the uniform surface polishing of the entire surface of a work during the final process. This conventional method consisting of using a magnetic fluid, putting it under a magnetic field having a specified intensity, and polishing a work while controlling the orientation of grinding stone particles poses a problem when a work requiring high-precision polishing must be polished in a direction in a tri-dimensional space.

Furthermore, the polishing material solidifies when exposed to low temperatures close to −15° C. while the atmospheric temperature prevalent during polishing is close to −30° C. This temperature difference requires some adjustment when the method is to be put into practice.

SUMMARY OF THE INVENTION

An object of the present invention is to provide a grinding particle body in which the phase transition from a liquid abrasive to a solid abrasive occurs in a temperature range facilitating practicality, and which enables polishing or grinding at normal temperatures.

Another object of this invention is to orientate grinding particles in a specific direction by utilizing the orientation characteristic of a grinding particle orientation material, and externally applying an electric or magnetic field to the grinding particles, thereby improving the grinding and polishing properties of the particles.

The present invention provides a polishing material which not only retains the merits of a fluid grinding stone containing grinding particles, that is, the property of freely changing its shape in accordance with the shape of the surface to be polished, and the property of invading into a narrow closed recessed surface inaccessible to human hands or a tool, but is also provided with the merit of a solid grinding stone, that is, the property of enabling rapid abrasion-grinding or coarse polishing, and a method using such a material. To achieve this object, this method is configured such that a fluid containing grinding particles is solidified or gelatinized in accordance with the shape of a work, and the resulting solid or gel material is moved relative to the work, thereby polishing or grinding the work.

Further, the invention provides a polishing material wherein the fluid containing grinding particles is a magnetic fluid capable of controlling the orientation of grinding particles in the presence of a magnetic field, and is solidified or gelatinized while being in the presence of a magnetic field.

The invention provides a polishing material wherein the fluid containing grinding particles is an electric rheology fluid capable of controlling the orientation of grinding particles in the presence of an electric field and is solidified or gelatinized in the presence of an electric field. The invention provides a polishing material wherein the grinding particles polarize in the presence of an electric field.

The invention provides a polishing material wherein the fluid, containing water as a substrate, solidifies by being exposed to a temperature not higher than its solidification point, and liquefies by being exposed to a temperature higher than the solidification point.

The invention provides a polishing material wherein the fluid, containing as a substrate a substance capable of polymerizing in the presence of light, solidifies or gelatinizes by being exposed to light.

The invention provides a polishing material wherein the substance capable of polymerizing is at least one arbitrarily chosen from the group comprising styrene, methyl methacrylate and vinyl acetate.

The invention provides a method for preparing a polishing material comprising the steps of pouring a fluid containing grinding particles on the surface of a work to be processed; and solidifying or gelatinizing the fluid in accordance with the shape of the surface of work to be processed.

The invention provides a method for polishing or grinding a work comprising the steps of solidifying or gelatinizing a fluid containing grinding particles in accordance with the shape of a work; and moving the resulting solid or gel material relative to the work.

The invention provides a method for polishing or grinding wherein the relative movement occurs as a mechanical vibration between the material and the work.

The invention provides a method for polishing or grinding a work comprising the steps of solidifying or gelatinizing a magnetic fluid capable of controlling the orientation of grinding particles in the presence of a magnetic field, in accordance with the shape of a work; solidifying or gelatinizing the fluid while it is exposed to a magnetic field; and moving the resulting solid or gel matter relative to the work.

The invention provides a method for polishing or grinding wherein the relative movement is evoked by alternate magnetic fields.

The invention provides a method for polishing or grinding a work comprising the steps of solidifying or gelatinizing a fluid containing dielectric grinding particles capable of polarizing in the presence of an electric field in accordance with the shape of a work; solidifying or gelatinizing the fluid while it is exposed to an electric field; and moving the resulting solid or gel material relative to the work.

The invention provides a method for polishing or grinding wherein the relative movement is evoked by alternate electric fields.

The invention provides a polishing method comprising the steps of solidifying the fluid; liquefying again part of the solid material on the surface in contact with a work to be processed; and moving the solid material relative to the work.

The grinding particle body for abrasion-grinding according to the invention is characterized by containing as the main ingredient of solvent at least one of the compounds represented by the following general formula,

where $R1=C_aH_{2a+1}$, $10 \leq a \leq 25$, and $R2=C_bH_{2b+1}$, $1 \leq b \leq 25$, and by dispersing grinding particles or a grinding particle orientation material in that compound.

A grinding particle body for abrasion-grinding is characterized by containing as the main ingredient of solvent at least one out of stearic acid esters or myristic acid esters.

A grinding particle body for abrasion-grinding is characterized by containing grinding particles which are made of at least one out of aluminum oxide or diamond whose particle-diameter distribution has the central point at 2 to 9 $\mu$m.

A grinding particle body for abrasion-grinding is characterized by having the grind particle orientation material which contains as its main ingredient ferrite particles whose particle distribution has the central point at 2 $\mu$m or less.

A grinding particle body for abrasion-grinding wherein reversible phase transition occurs between liquid and solid states with the melting point of the solvent serving as the phase boundary.

A grinding particle body for abrasion-grinding is characterized by being used as a polishing material when it turns into a solid as a result of phase transition.

A grinding particle body according to this invention is effectively used as a polishing material, and use thereof consists of pouring a liquid grinding particle body for abrasion-grinding on to the surface to be polished for contact; converting the body to a solid at a temperature range of 0–65° C.; and moving the resulting solid relative to the surface to be polished. In addition to the method whereby a liquid grinding particle body for abrasion-grinding is poured, and solidified in the presence of a magnetic field for use, there is a method whereby a liquid grinding particle body is molded to have a specific form, and is stored as such. This method comprises the steps of preparing a mold for injection; injecting a liquid grinding particle body for abrasion-grinding into the mold; converting it to a solid in the presence of a magnetic field, thereby producing a solid grinding stone; repeating the last process to obtain many stones for storage; and using them for abrasion as needed. This method makes it possible not only to rapidly meet the urgent need for abrasion, but to prepare grinding stones having a specific shape in accordance with the shape of a frequently used work.

A polishing apparatus according to this invention provides not only merits inherent to a solid grinding stone but also merits inherent to a liquid grinding body: it develops a comparatively strong power for polishing or grinding, while it freely varies its shape in accordance with the shape of a surface to be processed, and thus invades into a narrow, closely recessed surface rejecting the access of human hands or a solid grinding stone.

Use thereof consists of using a polishing material which has solidified or gelatinized in accordance with the shape of the surface of a work to be processed; and moving the polishing material relative to the work, thereby giving a polish to the work. The relative movement occurs as a mechanical vibration of the polishing material against the work. However, if the polishing material is a magnetic fluid capable of controlling the orientation of grinding particles in the presence of a magnetic fluid, it is possible to evoke the relative movement by applying alternate magnetic fields to the polishing material. Alternatively, if the polishing material is a fluid containing grinding particles capable of polarizing in the presence of an electric fluid, and has solidified or gelatinized in the presence of an electric field, it is possible to evoke the relative movement by applying alternate electric fields to the polishing material.

The relative movement may occur in a uni-, two- or tri-dimensional direction, depending on the three dimensional expanse of the surface of a work to be polished. The relative movement proceeds from one dimension to another in a sequential order, or along the dimensions at the same time.

The polishing apparatus according to this invention comprises a driving means for evoking a relative movement between a polishing material formed in accordance with the shape of the surface of a work to be processed, and the work; a pressure detection means for detecting pressure generated on the work by the polishing material during the relative movement; and a control means for controlling the stroke distance of relative movement according to the value of pressure detected by the pressure detection means, a specific value of pressure having been fed to the control means, and the control means controlling the driving means such that the value of pressure during the relative movement corresponds with the specified value.

DESCRIPTION OF THE PREFERRED EMBODIMENTS

Figure 1:
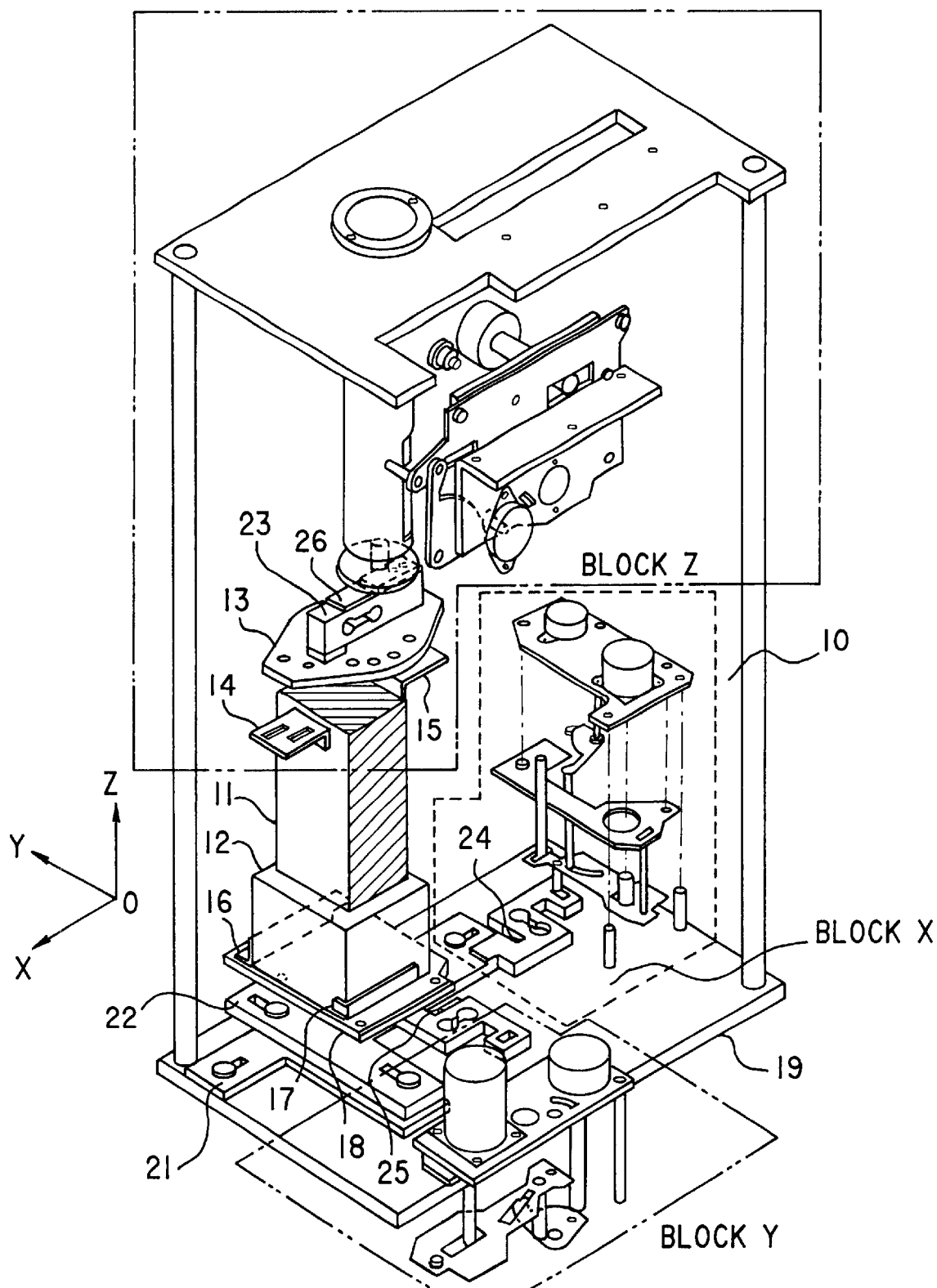
FIG. 1 shows the entire mechanisms of a polishing apparatus of this invention based on a mechanical force.

Because, with this invention, a fluid containing grinding particles is poured on the surface of a work to be polished so as to contact directly with the latter, and is left there to solidify, to produce thereby a polishing material, it is possible to produce single products of the polishing material or a small amount of the polishing material.

The present invention may be advantageously applied for grinding and polishing of, taking a few concrete examples, dioptrically adjusted eye-glasses, prisms having a specified shape, mirrors, etc. in optics, casings of various industrial products, jewelry, parts of watches, and gauges, cylinders, parts of bearings, cams, and bearing balls requiring high precision. Further, it may be applied for the fine surface polishing during a final fabrication process of a silicone wafer serving as a base of an integrated circuit. To mention a few special applications, the present invention may be applied for grinding and polishing of a denture or bone implant, to finely modify their shape.

The polishing method of the present invention based on the solidification or gelatinization of a fluid containing grinding particles will be described in detail below.

The applicable fields of polishing materials, grinding materials, and polishing method of this invention are so wide as mentioned above that the kind and characteristics of grinding particles and a fluid containing the grinding particles may be determined according to the texture of a work to be processed, and the required polishing precision.

The applicable grinding particles may include, to mention a few examples, iron oxides ($Fe_3O_4$, $Fe_2O_3$, etc.) as magnetic grinding particles, and alumina ($Al_2O_3$), silica ($SiO_2$), diamond or the like as non-magnetic grinding particles. The size of particles should be chosen to become smaller, as the required precision is higher. For example, if a work must be processed to a precision of $0.01\mu$ or less, grinding particles having a diameter of 10 nm or less must be chosen.

The magnetic particle orientation material consists of a mixture of magnetic particles and non-magnetic particles dispersed in a fluid, and arranges, in the presence of a magnetic field, magnetic particles in a chain-like structure, thereby enclosing grinding particles within the structure. However, this material will be described later.

The fluid may include water or a variety of oil species (animal oil, plant oil and mineral oil). To produce a magnetic fluid, principally water may be used, while to be used together with charged grinding particles, oil may be used. To prevent grinding particles from agglutinating in a fluid, a surfactant may be added.

The method of solidification or gelatinization may consist of lowering the temperature below the solidification point when a fluid consists of water, or of using an appropriate chemical reaction, besides the temperature control, when a fluid consists of oil.

The substance which solidifies or gelatinizes through polymerization when exposed to light (ultraviolet rays) may include a material composed of vinyl monomers comprising a mixture of one or more polymers such as styrene, methyl methacrylate, vinyl acetate, etc. Ammonium dichromate may be added thereto as an initiator.

The method by which to control the orientation of grinding particles in fluid prior to solidification or gelatinization is very important for the present invention. This is because the distribution density of grinding mi particles in contact with the surface of a work to be polished has a grave effect on the polishing speed and polishing precision. Because the specific gravity of grinding particles is different from that of fluid, the grinding particles may deviate from the surface during solidification or gelatinization no matter how thoroughly the grinding particles have been mixed with fluid through vigorous agitation. To avoid such inconvenience, it is necessary to control the orientation or distribution density of grinding particles before introduction of solidification or gelatinization.

The method by which to control the orientation of grinding particles in fluid during solidification may be introduced together with a magnetic environment for a magnetic fluid, or with an electric environment when dielectric grinding particles are used.

If a magnetic fluid and work are placed under a magnetic environment, magnetic particles are arranged along magnetic fluxes. Because the number of fluxes passing through a unit cross-section increases in proportion with the intensity of magnetic field, it is possible to control the density of orientated grinding particles by adjusting the intensity of magnetic field. Through this arrangement it is possible to control the distribution density of magnetic fluid in a fluid body in accordance with the purpose and requirement of a given process.

If dielectric particles are used, and placed under an electric field, the dielectric particles will undergo polarization, and take a chain-like pillar structure as a result of an effect known as electric rheology effect. Before the electric field is applied, the dielectric particles are uniformly dispersed in a grinding particle body. When an electric field is applied, attractive forces develop among polarized particles in the direction of the electric field, and the particles are orientated in a direction. A large number of particles in the grinding particle body move to have an orientation relative to each other, and thus a chain-like pillar structure results. When the large number of dielectric particles move to take the same orientation, thereby forming a chain-like pillar structure, basic grinding particles and other particle components also aggregate together being enclosed between adjacent pillar structures, to form thereby a structure having a certain columnar structure themselves.

When grinding particles having a dielectric property are used, it is possible for the grinding particles to also act as a grinding particle orientation material. When such a material is placed under an electric field, the particle body will take a structure in which grinding particles take a certain orientation, to provide a desired polishing material.

The grinding particle body to be used in this embodiment has grinding particles dispersed uniformly before it is exposed to an electric field. The body, even if solidified or gelatinized without being exposed to an electric field, may provide a good polishing material. However, if it is exposed to an electric field, and the grinding particles are orientated in a certain direction to become, so to say, like the sharpened teeth of a saw, a polishing material having a higher polishing activity and efficiency will be obtained.

Adjustment of the dimension of pillars in the structure of grinding particle components can be achieved by modifying the electric environment applied externally, and thus it is also possible to adjust the size of the pillar and the interval between adjacent pillars most appropriately for a given polish purpose.

A polishing material containing grinding particles solidified or gelatinized in the manner as described above is vibrated or rocked relative to the surface of a work to be processed, to achieve grinding or polishing of the surface. Depending on the degree of solidification, the grinding material may adhere to the surface to be processed. If the grinding material were forcibly moved relative to the surface at this state, polishing efficiency would remain low. To meet such a situation, it is recommended to slightly liquefy the material at the contact surface between the grinding material and the surface to be processed, and then to move the grinding material relative to the surface. The method by which to liquefy the material at the contact surface between the grinding material and the work surface may include temperature control consisting of keeping the temperature of the work over the solidification point of the fluid, or previous coating on the work surface of an agent having a solidification point lower than that of the fluid.

The method by which to move the polishing material relative to a work may include, as the most common one, mechanical vibration, and alternate magnetization when the material is a magnetic fluid, or alternate electrification when the material contains dielectric grinding particles.

The direction of the relative movement may vary depending on the shape of the work surface: if the work surface is planar, the movement may occur in a uni-dimensional line or two-dimensional plane; and if the work has a tri-dimensional surface, the movement may occur in a tri-dimensional space. The multidimensional movement may occur one dimension after another sequentially, or proceed along the involved dimensions in parallel.

The stroke of relative movement should be adjusted according to the type of processing to be achieved. To achieve vigorous grinding for a unit length of time, preparing a polishing material containing a high density of large-sized particles and moving it relative to a work with a large stroking distance will be suitable. On the contrary, to achieve fine surface polishing requiring high precision, preparing a polishing material containing small-sized grinding particles solidified or gelatinized, and moving it relative to a work with a small stroking distance will be suitable. With this invention it is possible to adjust the stroke distance in such a way as to enlarge it for the first phase of processing or grinding, and to lessen it gradually to be suitable for the final phase of processing or polishing. It is further possible to feed the desired size of a work into the control unit of a polishing apparatus of this invention before processing starts, and to allow the apparatus to process the work on the basis of self-control while monitoring the size of work and stress pressure on the surface of work.

The grinding particle body for grinding according to this invention is characterized by having grinding particles and a grinding particle orientation material dispersed in a solvent, the resulting mixture being able to turn from a liquid state into a solid state at normal temperatures, the grinding particles and grinding particle orientation material taking a certain orientation when solidified under a magnetic field, and the phase transition occurring reversibly. Because the body may be used at normal temperatures, its practical value as a grinding material is greatly improved.

With this invention, the solvent dispersing grinding particles and grinding particle orientation material therein is important for the resulting abrasion-grinding body to keep solid at normal temperatures, and be able to turn into a liquid reversibly. Particularly, the abrasion-grinding particle body must allow grinding particles in liquid state to be orientated in a direction in the presence of a magnetic field, and to keep the orientation still in solid state, and maintain a solid property suitable as a polishing material. Because change of the material property (transition from liquid state to solid state) must occur at normal temperatures, or within a temperature range of only 10–20° C., the abrasion-grinding particle body must have a sufficiently low viscosity to keep the magnetically imposed orientation of magnetic particles. Further, because the grinding particle body must have a property of reversibly shifting between liquid and solid states, it may use a low molecular weight substance for solvent, and satisfy the above requirement by utilizing the material property of that substance near at its melting point. Other requirements for the solvent include its allowing grinding particles and grinding particle orientation body to readily disperse during its liquid phase, and its not interfering with the orientation characteristics of the magnetic particles and magnetic particle orientation material in the presence of a magnetic field. A solvent, as far as it satisfies these requirements, can be used in this invention. The saturated fatty acid esters represented by the following chemical formula (1) are useful as a main ingredient of the solvent of this invention:

$$R1\text{—}COO\text{—}R2 \qquad (1)$$

where R1=CaH2a+1, 10 a 25; and R2=CbH2b+1, 1 b 25.

The saturated fatty acid ester within a range as described above has a low molecular weight, stays solid because it has a melting point at normal temperatures, reversibly shifts into a liquid phase when heated, is easy to handle, and allows polishing even without the use of a special apparatus. It has also the solvent property of allowing magnetic particles and magnetic particle orientation material to readily disperse in it, and of not interfering with the orientation characteristics of magnetic particles and magnetic particle orientation material. Of the saturated fatty acid esters, stearic acid esters such as methyl stearate, butyl stearate, stearyl stearate or the like, and myristyl myristate are excellent in the above properties, and bring effective results when used as a solvent of the abrasion-grinding particle body of this invention.

The grinding particles used in this invention may include aluminum oxide ($Al_2O_3$), silicone dioxide ($SiO_2$), diamond or the like, and an appropriate one among them should be chosen according to the nature of a work to be processed. The diameter of grinding particles may be determined according to the required polishing precision. Generally, grinding particle having a smaller diameter will be suitable, as the required polishing precision is higher. However, grinding particles having a too small diameter may pose a problem by agglutinating together in solvent. For magnetic particles to have a good orientation property in the presence of a magnetic field, they preferably have a diameter in the range of 2–9 μm.

The magnetic particle orientation material of this invention may include magnetic powder composed of ferrite particles. This magnetic powder is to provide grinding particles dispersing in solvent with an orientation property, and acts as an important element to help the abrasion-grinding particles function as a polishing material. When the abrasion-grinding body is placed in a magnetic field, magnetic powder aligns along the magnetic flux to form pillars, and to orientate grinding particles between the pillars. Therefore, development of the pillars and their linearity affect the orientation of grinding particles. Because, with this invention, grinding particles are orientated at a normal temperature; at the same time the grinding particle body is solidified; and the resulting body is used as a polishing material, it is particularly important to maintain the orientation of magnetic particles during polishing. To optimize the development of pillars, the magnetic powder preferably should have a particle diameter of 2 μm or less.

FIG. 7 illustrates using a model how the pillars develop and grinding particles are orientated. FIG. 7(a) illustrates how grinder particles 62 and magnetic powder element 63 disperse in solvent 61. FIG. 7(b) illustrates how magnetic powder elements 63 aggregate together along the direction of magnetic fluxes, thereby forming pillars. FIG. 7(c) illustrates how developing pillars, after repeated repulsion and attraction, are arranged in parallel with an equal distance between adjacent pillars expelling grinding particles 62 which come to be inserted between pillars. FIG. 7(d) how magnetic powder elements 63 adhere to each other to grow on upper and lower ends where the intensity of the magnetic field is comparatively large, the columnar arrangement of grinding particles 62 being facilitated by the development of pillars. Because the number of magnetic fluxes per unit sectional area is proportional to the intensity of magnetic field, it is possible to control the density of the columns of grinding particles by adjusting the intensity of magnetic field. In this way, it is possible to control the distribution density of magnetic particles in solvent according to a given application and requirement.

Figure 8A:
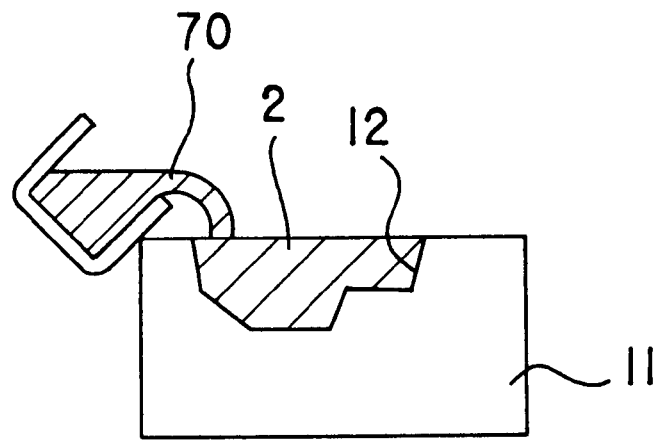
FIGS. 8(a)–8(b) show the principle underlying the process for manufacturing a grinding particle body for abrasion-grinding of this invention.
Figure 8B:
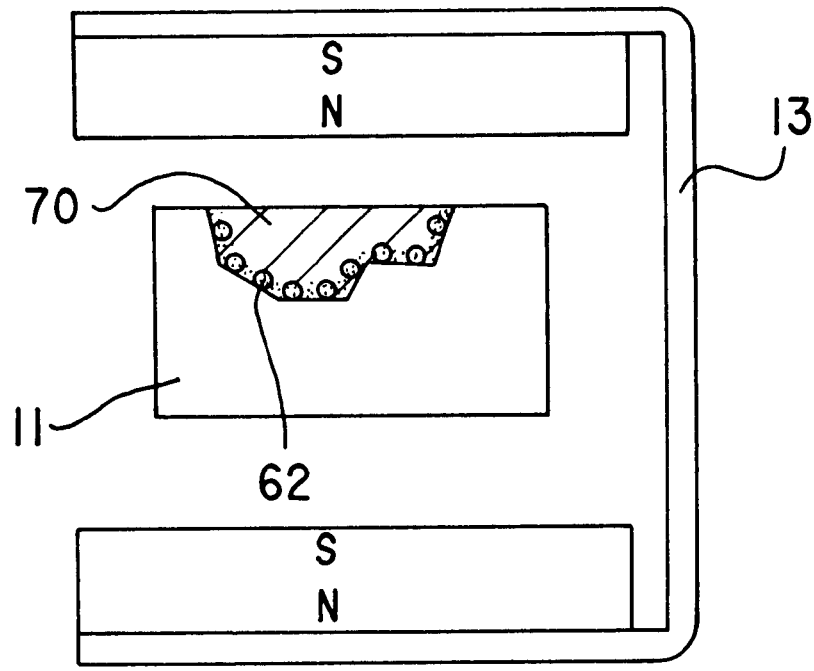

The grinding particle body for abrasion-grinding 70 according to this invention can be obtained by mixing the above components with stirring. If the solvent is solid when it is mixed, it should be preferably heated to become liquid, and the mixture be stirred. The grinding particle body for abrasion-grinding prepared as above may contain 25–60 wt. % of solvent, 15–25 wt. % of grinding particles, and 20–60 wt. % of grinding particle orientation material. Preparation of a grinding particle body for abrasion-grinding proceeds as follows: a grinding particle body for abrasion-grinding 10 staying liquid is poured on a recessed surface 12 of a work 11 as shown in FIG. 8(a); the work 11 having received a lump of grinding particle body 70 is mounted on a magnetic field generator 13 as shown in FIG. 8(b); and while a magnetic field is applied in a vertical direction, the assembly is cooled to a normal temperature, thereby turning the grinding particle body 10 into a solid, as well as adjusting the columnar arrangement of grinding particles 2 and their distribution density. The magnetic field generating means may be a permanent magnet giving a magnetic field with a specified intensity, or a magnet comprising a magnetizing material of a silicon copper laminated body or a ferrite material having a wire wound around. If an electric magnet is used, it is possible to freely adjust the intensity of magnetic field to a desired level.

The abrasion method consists of vibrating or rocking the body relative to the surface of a work to be processed. Depending on the degree of solidification, the grinding particle body may adhere to the surface to be processed. If the grinding particle body were forcibly moved relative to the surface at this state, polishing efficiency would remain low. To meet such a situation, it is recommended to heat the body so much as to allow the body to have a temperature just above the melting point of its solvent, thereby producing a thin melt layer at the contact surface of the solid body with the surface to be processed, and then to move the body relative to the surface. Heating may take place by high frequency heating or by heater heating. To achieve fine polishing such as fine mirror polishing on the surface of a work, it is preferable to prepare in advance a thin melt layer on the contact surface, thereby lowering the hardness of the body. The method by which to melt the body at the contact surface may include previous coating on the work surface of an agent having a melting point lower than that of the solvent, as well as the heating method as described above.

The method by which to move the polishing material relative to a work may include, as the most common one, mechanical vibration, and alternate magnetization. The direction of the relative movement may vary depending on the shape of the work surface: if the work surface is planar, the movement may occur in a uni-dimensional line or two-dimensional plane; and if the work has a tri-dimensional surface, the movement may occur in a tri-dimensional space. The multidimensional movement may occur one dimension after another sequentially, or proceed along the involved dimensions in parallel.

The stroke of relative movement should be adjusted according to the type of processing to be achieved. To achieve a large wearing-away per a unit length of time, preparing a polishing material containing a high density of large-sized particles and moving it relative to a work with a large stroking distance will be suitable. On the contrary, to achieve fine surface polishing requiring high precision, preparing a polishing material containing small-sized grinding particles solidified, and moving it relative to a work with a small stroking distance will be suitable. With this invention it is possible to adjust the stroke distance in such a way as to enlarge it for the first phase of processing or grinding, and to lessen it gradually to be suitable for the final phase of processing or polishing. It is further possible to feed the desired size of a work into the control unit of a polishing apparatus of this invention before processing starts, and to allow the apparatus to process the work on the basis of self-control while monitoring the size of work and stress pressure on the surface of work.

Next, a polishing material obtained by freezing a magnetic fluid for solidification, polishing method and polishing apparatus representing examples of this invention will be described with reference to the attached figures.

Figure 6:
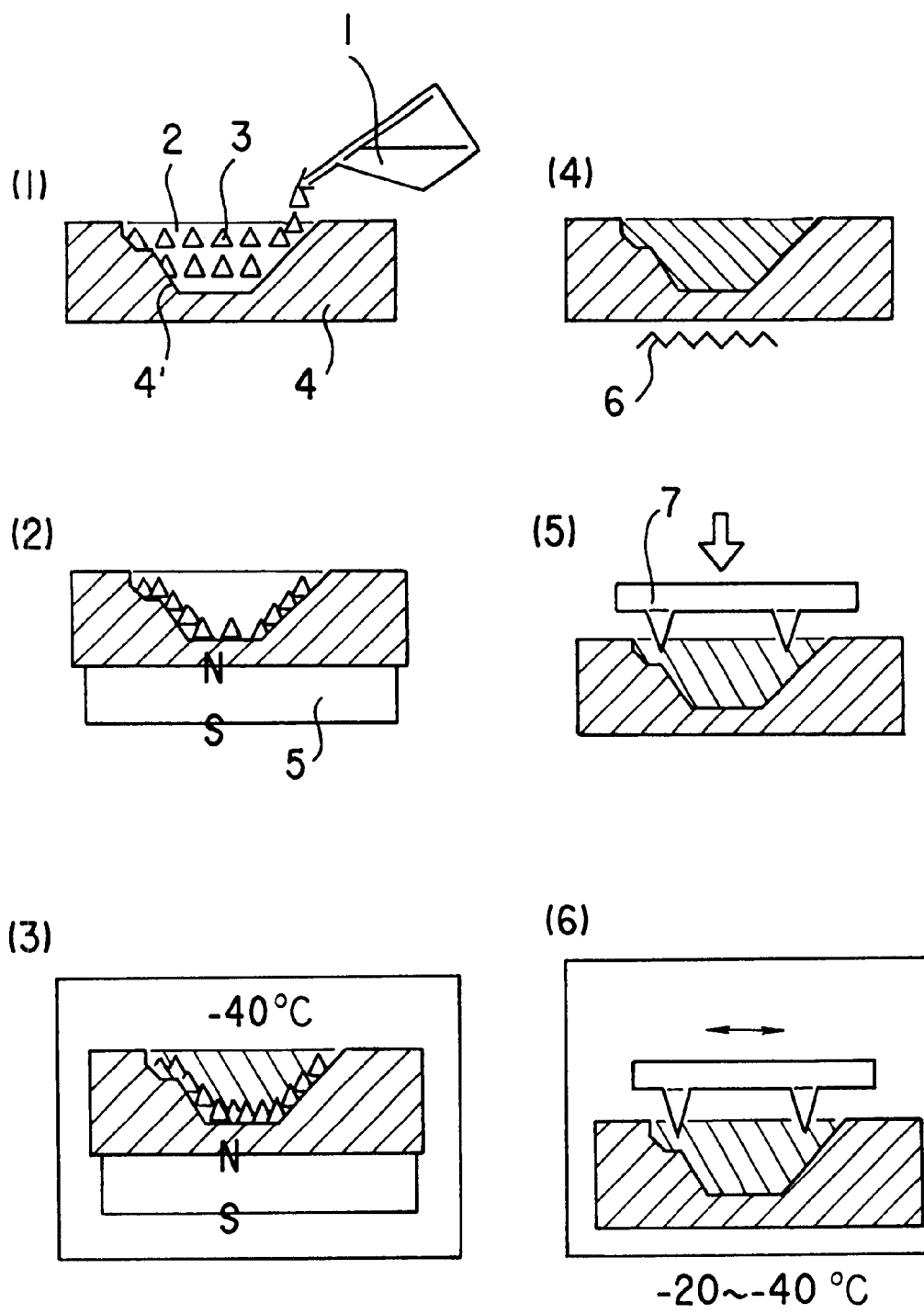
FIGS. 6(1)–6(6) shows an example to indicate how a fluid containing grinding particles is solidified in accordance with the surface of a work to be processed.
Figure 7A:
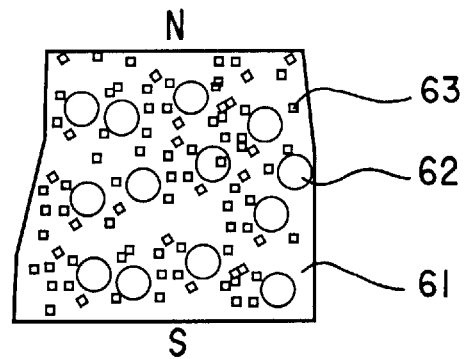
FIGS. 7(a)–7(d) schematically show the process of this invention whereby grinding particles of a grinding particle body for abrasion-grinding are arranged in columns.
Figure 7B:
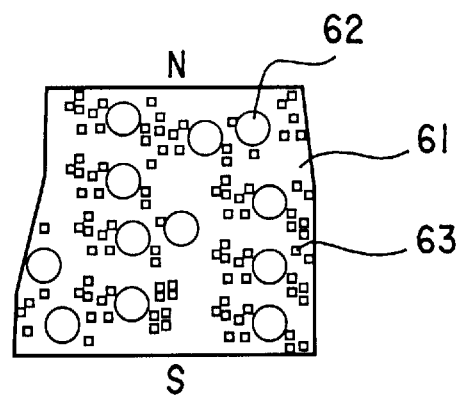
Figure 7C:
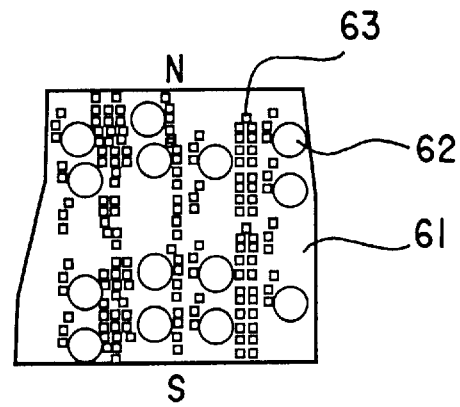
Figure 7D:
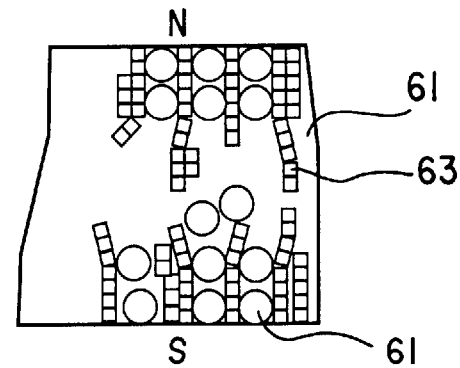

FIG. 6(1) shows how a magnetic fluid 1 containing a specified amount of magnetic grinding particles is poured into a recessed surface 4' of a work 4. The fluid, after being supplemented with a surfactant to prevent freezing, is stirred in advance. The magnetic fluid 1 flows onto the work surface 4', and entirely covers the work surface 4', to intimately contact with the latter.

FIG. 6(2) shows that the work 4 having received magnetic fluid 1 on its recessed surface 4' is mounted on a magnetic field generating means 5. The magnetic field generating means may be a permanent magnet giving a magnetic field with a specified intensity, or a magnet comprising a magnetizing material of a silicon copper laminated body or a ferrite material having a wire wound around. If an electric magnet is used, it is possible to freely adjust the intensity of magnetic field to a desired level. It is possible to adjust the columnar arrangement of magnetic particles and their distribution density by submitting magnetic fluid 1 to the magnetic field environment generated by magnetic generating means 5.

FIG. 6(3) shows that work 4 having received magnetic fluid 1 on its recessed surface and submitted magnetic fluid 1 to a magnetic field environment is placed in a low temperature environment, thereby solidifying the magnetic fluid while maintaining the internal structure of the fluid intact. Because the freezing point of the magnetic fluid containing water as a main ingredient may vary more or less depending on the content of water, but generally is minus several tens degree centigrade, a freezer may be used. If the fluid has a solidification point below minus hundred degree centigrade, liquid nitrogen may be used.

FIG. 6(4) shows that, if the solidified magnetic fluid 1 intimately adheres to work 4, work 4 is heated so much as to allow magnetic liquid 1 to have temperature just above its melting point, to produce thereby a thin melt layer at the contact surface of the solidified magnetic fluid with work surface 4'. Most commonly heating takes place by high frequency heating or heater heating. Through this process, it is possible to facilitate the movement of magnetic fluid relative to work 4. However, if melting proceeds to much, it will affect the precision of polishing.

FIG. 6(5) shows that one end of a holding means 7 of a mechanical vibration generating system (not illustrated here) is struck into the upper portion of the solidified magnetic fluid. The same system holds the work with the other device to fix it, and generates a relative movement between the two holding means to achieve grinding or polishing.

In the figure the relative movement occurs along a uni-dimensional direction, but the relative movement may occur in any direction depending on the shape of the surface of a work to be processed: it may occur in a uni-dimensional or two-dimensional direction when the work has a planer surface, or it may occur in a tri-dimensional direction when the work has a tri-dimensional surface. The multi-dimensional movement may occur one dimension after another sequentially, or proceed along the involved dimensions in parallel.

The stroke distance of the relative movement should be adjusted depending on the required processing. If it is desired to achieve a large wearing-away per a unit length of time, preparing a polishing material containing a high density of large-sized particles and moving it relative to a work with a large stroking distance will be suitable. On the contrary, to achieve fine surface polishing requiring high precision, preparing a polishing material containing small-sized grinding particles solidified or gelatinized, and moving it relative to a work with a small stroking distance will be suitable. With this invention it is possible to adjust the stroke distance in such a way as to enlarge it for the first phase of processing or grinding, and to lessen it gradually to be suitable for the final phase of processing or polishing. It is further possible to feed the desired size of a work into the control unit of a polishing apparatus of this invention before processing starts, and to allow the apparatus to process the work on the basis of self-control while monitoring the size of work and stress pressure on the surface of work.

FIG. 6(6) shows that a polishing material prepared as above is moved relative to the work with a polishing apparatus of this invention, to achieve thereby grinding or polishing of the work.

FIG. 1 relates to a polishing apparatus according to this invention, and shows the entire mechanisms of the apparatus capable of moving a polishing material relative to a work in a tri-dimensional space using a mechanical force. A polishing material 11 formed in accordance with the shape of the surface of a work 12 to be processed as described above is mounted on a polishing apparatus 10 together with the work 12. The polishing apparatus 10 comprises a mechanical block X to generate vibration in an X direction, mechanical block Y to generate vibration in a Y direction, and mechanical block Z to generate vibration in a Z direction. In an embodiment of this invention, polishing material 11 is moved relative to work 12 in a tri-dimensional direction, and to achieve this movement, work 12 is vibrated in X- and Y directions, while polishing material 11 is vibrated in a Z-direction.

The polishing apparatus has on its base frame 19 an X-axis sliding plate 21 to vibrate in an X-axis direction relative to frame 19, the X-axis sliding plate having thereupon a Y-axis sliding plate 22 to vibrate in a Y-axis direction, and the Y-axis sliding plate 22 having a table 18 to have a work 12 fixed thereupon. Table 18 is fixed to Y-axis sliding plate 22 with mounting brackets 16 and 17. X-axis sliding plate 21 is constituted in such a way as to be vibrated only in an X-axis direction by mechanical block X, while Y-axis sliding plate 22 is constituted in such a way as to be vibrated only in an Y-axis direction by mechanical block Y. Through this arrangement it is possible to move work 12 in an X-Y direction, while fixing it with respect to the Z-direction. A polishing material 11 is fixed to a chuck plate 13 with chucking brackets 14 and 15. The chuck plate 13 is fixed to a Z-axis vibrating member 23. Z-axis vibrating member 23 is constituted in such a way as to be vibrated in a Z-axis direction by mechanical block Z. Through this arrangement it is possible to move polishing material 11 relative to work 12 in a Z-axis direction, while fixing the material with respect to an XY-axis direction.

A work 12 and polishing material 11 are mounted to a polishing apparatus 10 having a constitution as described above; and work 12 and polishing material 11 move in an XY-axis direction and Z-axis direction, respectively. To achieve highly efficient and highly precise polishing, it is necessary to control the pressing force of polishing material 11 against work 12. For this purpose, pressure sensors 24 (X-axis direction), 25 (Y-axis direction) and 26 (Z-axis direction) comprising a load cell are attached in such a way as to detect the pressing force existent between work 12 and polishing material 11 along the respective axis directions. Through this arrangement it is possible to obtain vibration with a constant pressing force stroke in which polishing pressing forces along the respective axis directions are maintained at specific values, or to obtain vibration with a variable pressing force stroke in which the pressing force is varied with time depending on required polishing precision, that is, on coarse polishing or fine polishing.

Figure 2:
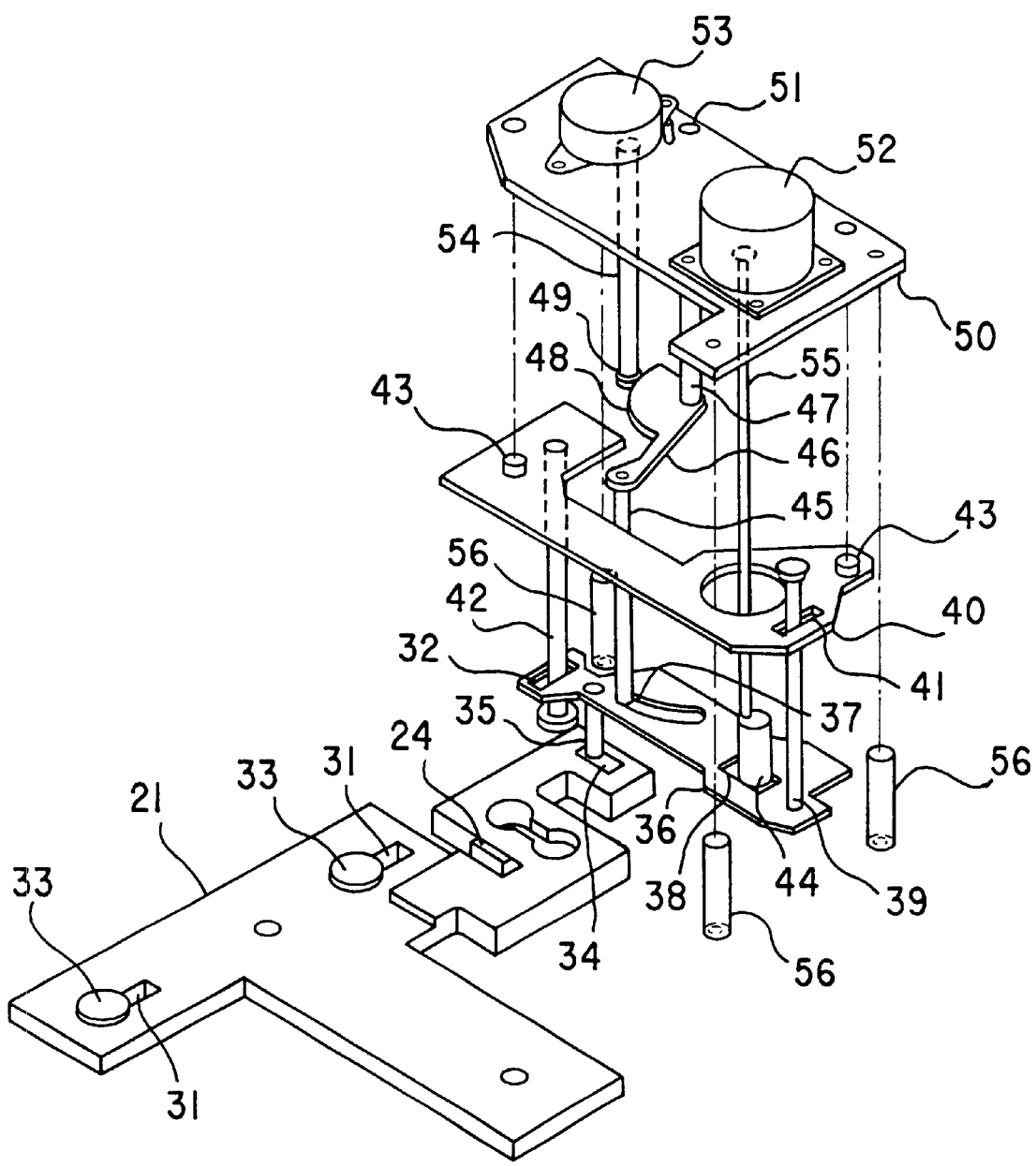
FIG. 2 shows a vibration generating mechanism to give a vibration along a direction (X-axis) within the polishing apparatus of FIG. 1.

FIG. 2 shows a vibration generating mechanism illustrated in mechanical block X to give a vibration in a direction (X-axis) within the polishing apparatus of FIG. 1.

The aforementioned X-axis sliding plate 21 carries the Y-axis sliding plate 22 shown in FIG. 1, and vibrates in an X-axis direction driven by an X-axis vibrating pin 35. A pressure sensor 24 detects the pressure exerted by X-axis sliding plate 21 in an X-axis direction. X-axis sliding plate 21 has two slits 31 having a specific length in an X-axis direction; and guide shafts 33 fixed to the polishing apparatus penetrate the slits 31. Through this arrangement, it is possible for X-axis sliding plate to vibrate at a stroke length equal to the length of the slit 31. X-axis sliding plate 21 has another slit 34 with which a vibrating pin 35 is engaged. The slit 34 is an opening extending in an Y-axis direction as shown in the figure. Through this arrangement, it is possible to prevent vibrations in Y-axis direction resulting from the vibrations of X-axis vibrating pins from being transmitted to X-axis sliding plate 21. Vibrating pin 35 is to vibrate X-axis sliding plate 21 in an X-axis direction, and is fixed to a vibrating plate 36.

Vibrating plate 36 has an arc-shaped slit 37 to determine the stroke length of vibration, and another slit 38 to receive a driving force for vibration. Further, a shaft 39 is fixed to vibrating plate 36; and the upper end of the shaft 39 engages with a slit 41 prepared on a guide plate 40. Because the slit cuts comparatively short in Y-axis direction and long in X-axis direction, it restricts the vibrations in Y-axis direction of vibrating plate 36. Another shaft 42 is fixed to guide plate 40; and one end of shaft 42 engages with another slit 32 prepared on vibrating plate 36. Because the slit 42, like slit 41 on guide plate 40, cuts comparatively short in Y-axis direction and long in X-axis direction, it restricts the vibrations in Y-axis direction of vibrating plate 36. Guide plate 40 are fixed to a base plate 50 by plural supporting shafts 43.

Base plate 50 has a vibration driving motor 52 and vibration stroke control motor 53 fixed thereupon, and is fixed to a base frame 19 by plural supporting pillars 56. Motors 52 and 53 preferably include a deceleration gear mechanism to achieve vibration of a specified number of revolutions per minute (RPM). The output rotation axle 55 of vibration driving motor 52 extends through a hole on guide plate 40 to vibration plate 36. The axle 55 has an eccentric axle 44 attached on its lowest end; and thus axle 55 is driven into a rotatory rocking motion through the rotation of the output axle 55 of vibration driving motor 52. Because the eccentric axle 44 engages with slit 38 on vibrating plate 36, the rotatory rocking motion of eccentric axle 44 puts vibrating plate 36 into rocking motion.

On the other hand the output rotation axle 54 of vibration stroke control motor 53 has a gear 49 attached to its lowest end; and gear 49 engages with the surface 48 of a fan-shaped gear 46. Fan-shaped gear 46 receives a rotation axle 51 on its collar 47; and rotation axle 51 is supported by base plate 50. Fan-shaped gear 46 has a protrusion extending like a tongue from its side; and a pin 45 is attached to the tip of the protrusion to hang therefrom. The pin 45 engages with arc-like slit 37 on the center of vibrating plate 36. Vibration stroke control motor 53 consists of a DC motor capable of rotating reversibly clockwise or counterclockwise, and of freely controlling the rotation angle of the rotation axle. Through this arrangement, it is possible to freely adjust the position of pin 45 in the arc-shaped slit of vibration plate 36. Opposite to slit 38 engaging with eccentric axle 44 with arc-shaped slit 37 in between there is fixed vibrating pin 35 described above.

With the vibration mechanism having a constitution as described above, if vibration driving motor 52 is put into rotation, the eccentric axle 44 attached to the lowest end of the rotation axis of motor performs rotatory rocking motion. Vibration plate 36, because it receives eccentric axle 44 in its slit 38, is driven into rocking motion in association with the rotatory rocking motion of eccentric axle 44. However, because slit 38 cuts comparatively long in Y-axis direction, rotatory vibrations in Y-axis direction are absorbed in this slit, and only vibrations in X-axis direction are transmitted to vibration plate 36. Further, because axle 39 fixed to vibrating plate 36 engages with slit 41 of guide plate 40, and slit 41 cuts comparatively short in Y-axis direction and long in X-axis direction as described above, vibrations in Y-axis direction of vibrating plate 36 are absorbed therewith. Still further, because axle 42 is fixed to guide plate 40; the lowest end of the axle 42 engages with slit 32 on vibrating plate 36; and slit 32 cuts comparatively short in Y-axis direction and long in X-axis direction, like slit 41 of guide plate 40, vibrations in Y-axis direction of vibrating plate 36 are absorbed therewith.

The vibration force in X-axis direction from vibration driving motor 52 vibrates through vibration pin 35 X-axis sliding plate 21 along X-axis.

Figure 3A:
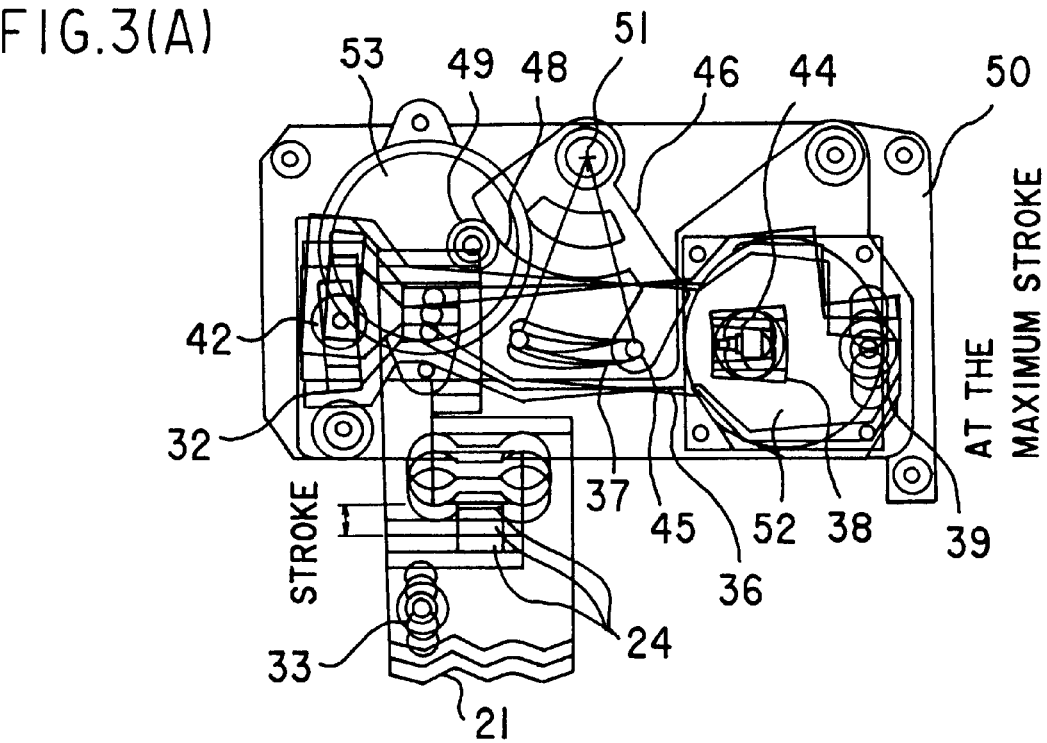
FIG. 3A shows a vibration stroke distance adjustment mechanism with a maximum stroke in the vibration mechanism shown in FIG. 2.
Figure 3B:
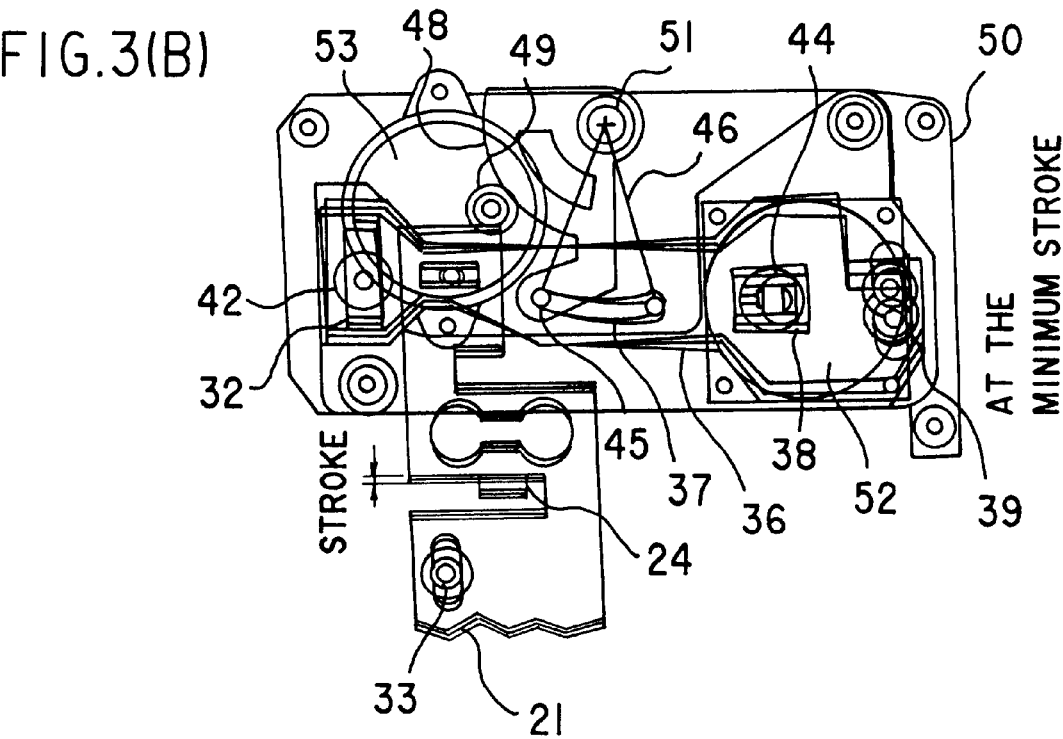
FIG. 3B shows a vibration stroke distance adjustment mechanism with a minimum stroke in the vibration mechanism shown in FIG. 2.

FIG. 3 illustrates a vibration stroke distance adjustment mechanism in the vibration mechanism shown in FIG. 2. FIG. 3(A) shows the same mechanism when pin 45 is shifted in arc-shaped slit 37 the closest to eccentric axle 44. Because vibrations occur with the settled position of pin 45 as a pivot, and in this case the vibration stroke transmitted by eccentric axle 44 is the largest, the stroke distance in X-axis direction of vibrations of X-axis plate 21 becomes the largest. FIG. 3(B) shows the same mechanism when pin 45 is shifted in arc-shaped slit 37 the closest to vibrating pin 35. Because in this case the vibration stroke transmitted by eccentric axle 44 is the smallest, the stroke distance in X-axis direction of vibrations of X-axis plate 21 becomes the smallest.

The mechanism to generate vibrations along X-axis direction has been described. It is possible, by introducing similar vibration mechanisms for Y- and Z-axis directions, to apply a mechanical force to a work 12 and polishing material 11 so that they perform a relative movement in a direction in a tri-dimensional space. The tri-dimensional movement may occur one dimension after another sequentially, or proceed along the involved dimensions in parallel.

Figure 4:
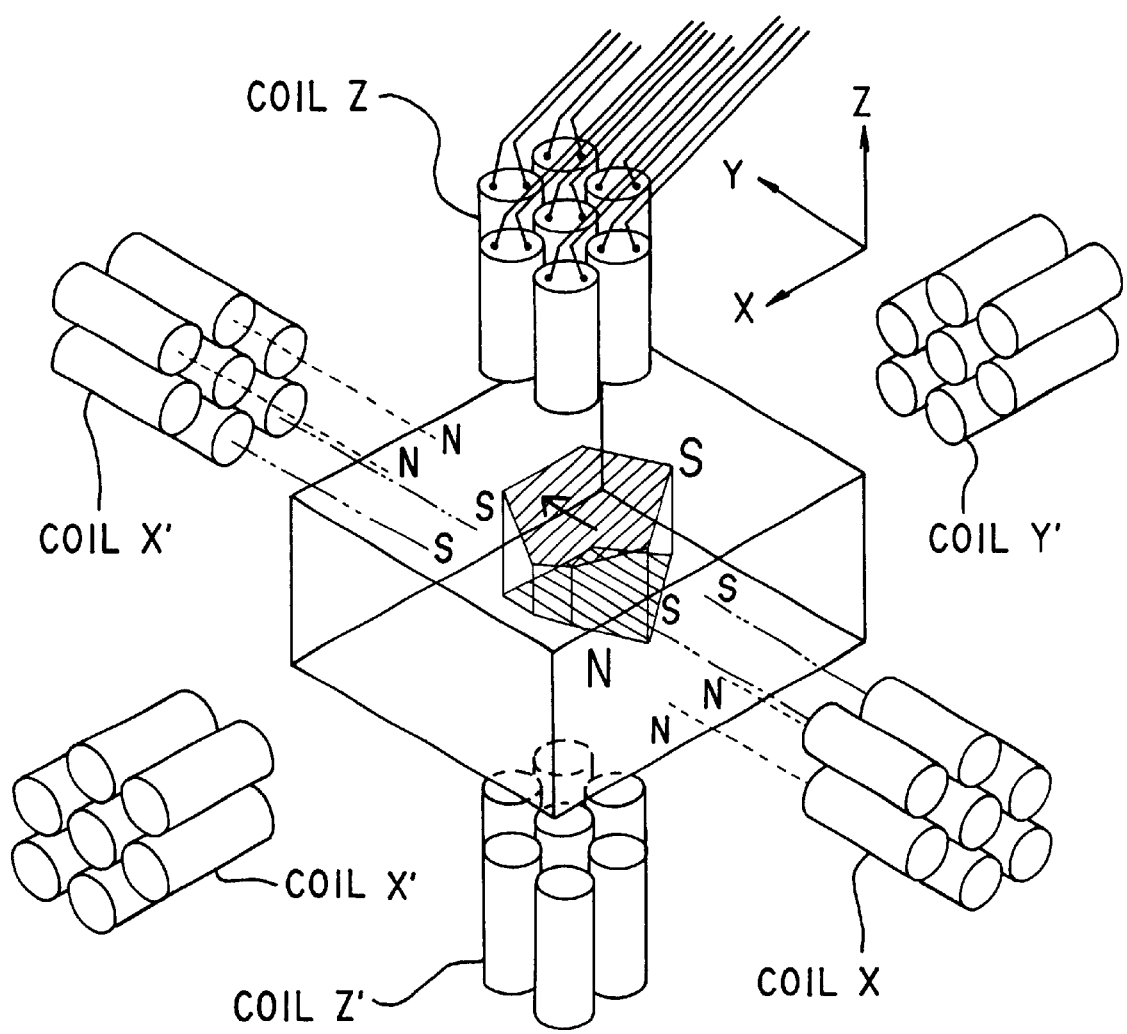
FIG. 4 shows the outline of the vibration mechanism based on a magnetic force

FIG. 4 shows the outline of a vibration mechanism using a magnetic force wherein alternate magnetic fields are applied to a polishing material which has resulted from solidification or gelatinization of a magnetic fluid containing grinding particles, to subject the polishing material to a relative movement.

Electric magnets comprising coils wound around magnetizing bodies are arranged at six positions along X-, Y- and Z-axis; and alternate currents having specific frequencies are given to the magnet pairs, thereby causing a relative movement in a tri-dimensional direction between work 12 and polishing material 11. It is possible to control the stroke distance of relative movement and polishing pressure, by adjusting the frequency of alternate current flowing through each pair of magnets arranged along the axis and its magnetic flux, according to the inertial moment of the solidified or gelatinized magnetic fluid.

Figure 5:
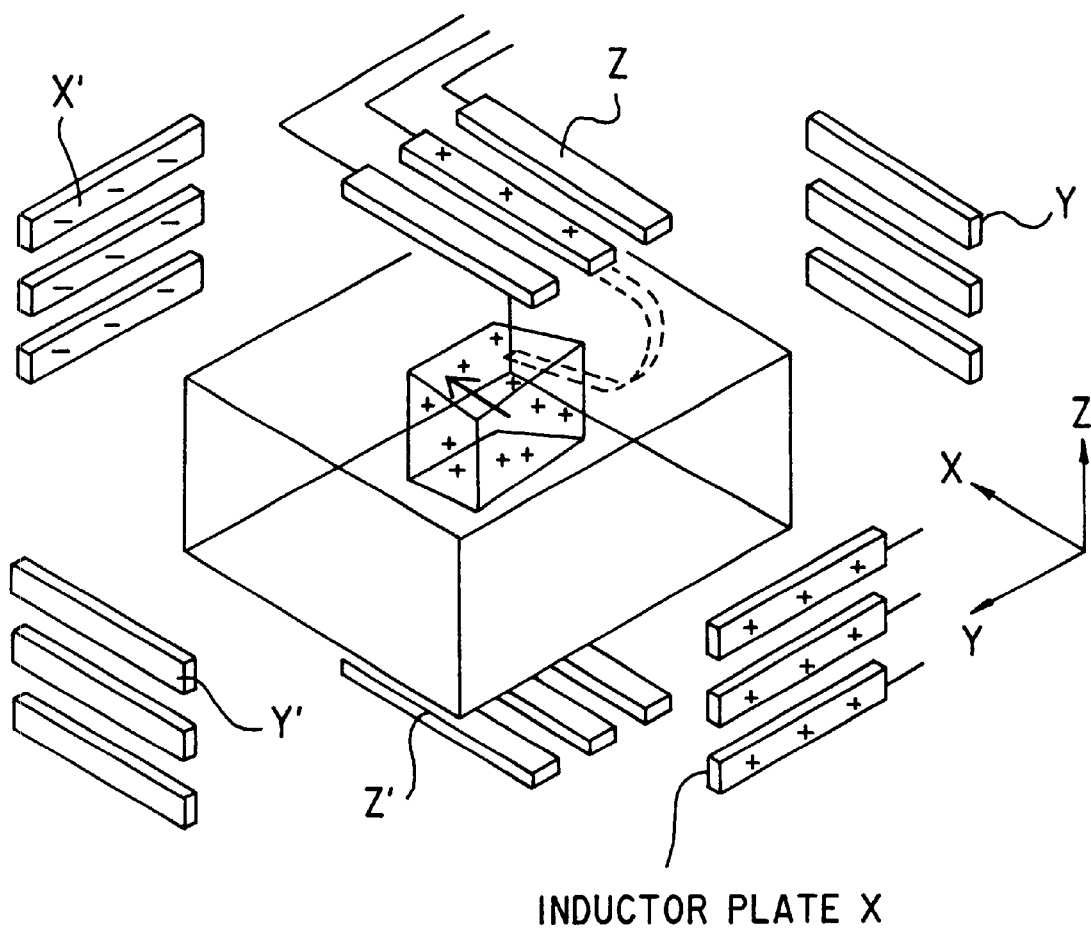
FIG. 5 shows the outline of the vibration mechanism based on an electric force

FIG. 5 shows the outline of a vibration mechanism which gives alternate electric fields to a polishing material comprising a solidified or gelatinized fluid containing dielectric grinding particles, thereby causing the fluid to make a relative movement as described above.

Electrode plates are arranged at six positions along X-, Y- and Z-axis; and alternate currents having specific frequencies are given to the electrode pairs, thereby causing a relative movement in a tri-dimensional direction between work 12 and polishing material 11. It is possible to control the stroke distance of relative movement and grinding pressure, by adjusting the frequency of alternate current and its voltage according to the inertial moment of the solidified or gelatinized polishing material containing dielectric grinding particles. If it is desired to achieve a large wearing-away per a unit length of time, preparing a polishing material containing a high density of large-sized particles and moving it relative to a work with a large stroking distance will be suitable. On the contrary, to achieve fine surface polishing requiring high precision, preparing a polishing material containing small-sized grinding particles solidified or gelatinized, and moving it relative to a work with a small stroking distance will be suitable. With this invention it is possible to adjust the stroke distance in such a way as to enlarge it for the first phase of processing or grinding, and to lessen it gradually to be suitable for the final phase of processing or polishing. It is further possible to feed the desired size of a work into the control unit of a polishing apparatus of this invention before processing starts, and to allow the apparatus to process the work on the basis of self-control while monitoring the size of work and stress pressure on the surface of work.

1) Hardness Test

[Preparation of Test Samples]

To methyl stearate 45 parts by weight liquefied as a result of heating were added aluminum oxide powder 25 parts by weight having an average particle diameter of 40 $\mu$m to serve as a grinding component, and ferrite powder 30 parts by weight having an average particle diameter of 2 $\mu$m or less to serve as a grinding particle orientation material; and the latter were thoroughly mixed with the former to disperse therein, to produce a grinding particle sample 1 for abrasion-grinding shown in Table 1. The same materials were processed in the manner as described above, excepting that solvent components as described in Table 1 were used instead of methyl stearate, and grinding particle samples 2 –4 for abrasive-grinding were obtained. In the latter case, if the solvent component was solid, it was converted to liquid by heating before mixture. Sorbitan tristearate had been added to the solvent to serve as a melting point adjusting agent, before the solvent received the grinding particle component for mixture.

[Table 1]

[Preparation of Grinding Particle Body for Magnetically Driven Abrasive-Grinding]

A 20 g of above sample was heated as needed to be converted to a liquid, and poured into a cylindrical vessel having a diameter of 5 cm. The cylindrical vessel containing the liquid sample was placed in a vertically-orientated magnetic field having an intensity of 200 Gauss, and was left to cool, to give a magnetic grinding particle sample. This magnetic grinding particle sample was cut longitudinally (parallel with the direction of magnetic field), and its cross-section was observed with a digital scope under 100 times magnification. For all the samples observed, white grinding particle bodies and black grinding particle orientation materials are arranged in bands in parallel with the direction of magnetic field.

(2) Polishing Test 1

A vertical surface (which had a direction vertical to the direction of magnetic field, and in which grinding particle bodies and grinding particle orientation materials appear alternately) of the thus obtained magnetic grinding particle sample was applied on the surface of a brass block having a coarseness of Ra=0.8 and Ry=7.6; and polishing was achieved by moving the sample against the brass block at a polishing velocity of 3 mm/s and polishing pressure of 0.5 N/mm$^2$ for 20 minutes. After polishing, the surface of brass block had a coarseness of Ra=0.2 and Ry=0.8, demonstrating the polishing effect.

[Rockwell Harness Test]

Figure 9:
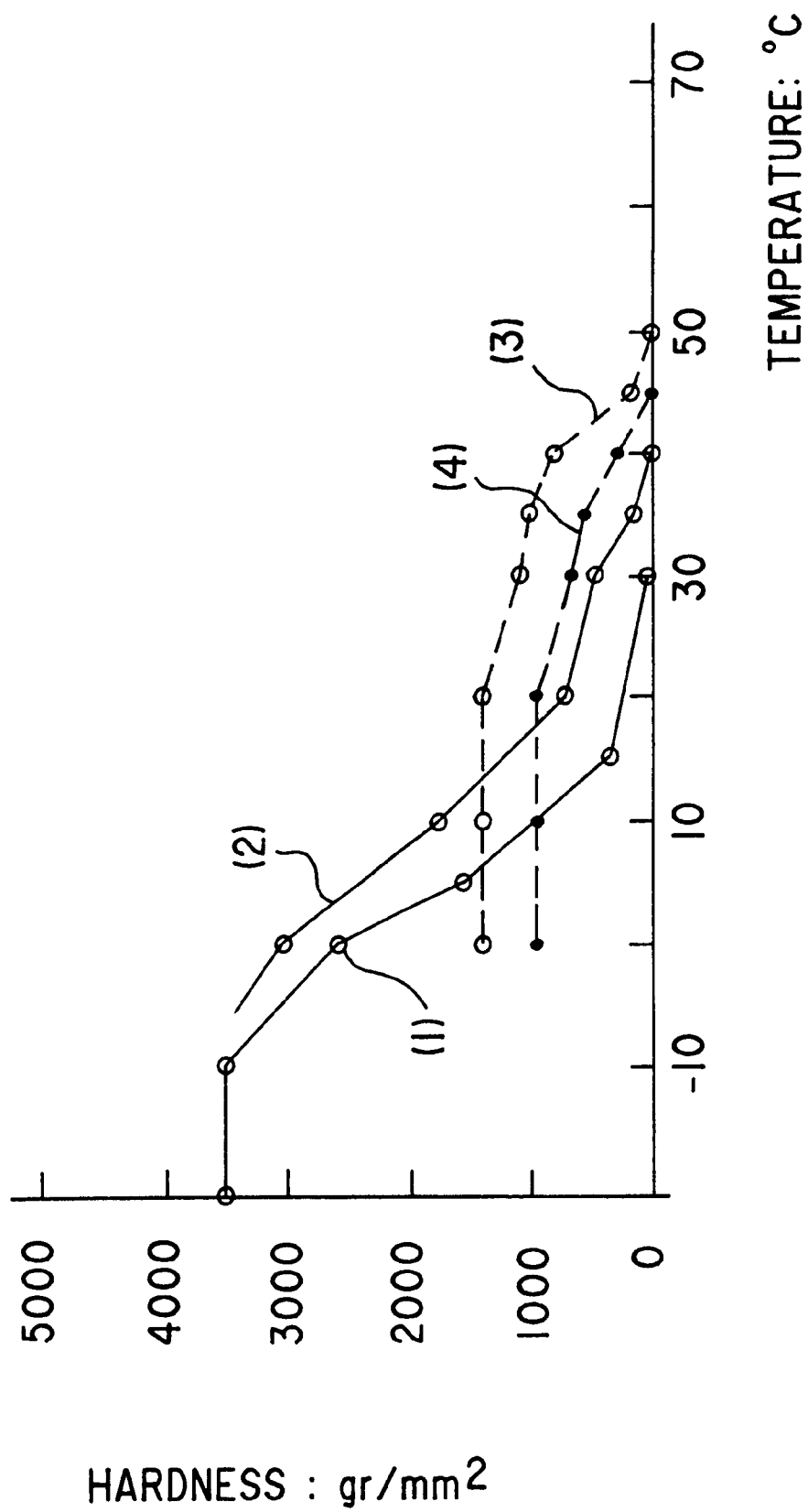
FIG. 9 shows graphs representing the results of hardness test applied to grinding particle bodies of this invention

Each of samples 1 to 4 of Table 1 above was placed in a tank with a thermostat; the temperature of tank was gradually raised while the sample was exposed to a magnetic field; a specific test temperature was maintained for 10 minutes; and the sample was subjected to a Rockwell hardness test based on a JIS standard. The results are shown in FIG. 9. The numbers (1) to (4) of FIG. 9 represent samples 1–4.

3) Polishing test 2

To 42.5 wt. % of methyl stearate staying liquid in a vessel, were added 42.5 wt. % of ferrite (Mo.Fe$_2$O$_3$) having a particle diameter of 2 $\mu$m or less and 15 wt. % of aluminum oxide (Al$_2$O$_3$) having a particle diameter of 9 $\mu$m, and the latter was allowed to disperse in the former through thorough mixture to give a sample. A magnetic field having an intensity of 160 Gauss was applied to this sample; the sample was cooled to about 20° C. while being exposed to the magnetic field and this state was maintained for about 10 minutes; and the sample was solidified. Then, this sample was transferred in a tank with a thermostat, and was attached to a polishing apparatus there. The polishing condition was as follows.

Polishing duration: 40 minutes

Polishing frequency: 3 cycles per second with a stroke distance of 4 mm

Polishing pressure: 150 gr/cm$^2$

Object to be polished: surface of aluminum block

The surface of aluminum block was checked with a surface coarseness gauge for its coarseness: the coarseness prior to polishing was Ra=2.4 and Ry=16, and the coarseness improved by polishing so much as to give Ra=0.7 and Ry=7.

REFERENCE NUMERALS

1: Magnetic fluid containing grinding particles
2: Fluid
3: Magnetic grinding particles
4: Work
5: Magnetic field generating means
6: Heater
7: Means for solidifying fluid capable of solidifying
10: Polishing apparatus
11: Polishing material
12: Work
21: X-axis sliding plate
22: Y-axis sliding plate
23: Z-axis vibrating member
36: Vibration plate (X-axis)
52: Vibration driving motor
53: Vibration stroke control motor
61: Solvent
62: Grinding particles
63: Magnetic powder elements (grinding particle orientation material)
70: Grinding particle body for abrasion-grinding

What is claimed is:

1. A polishing material prepared such that a fluid containing grinding particles is solidified in accordance with the shape of a work, with a controlled orientation of said grinding particles in the presence of a magnetic field, solidified material is moved relative to the work, thereby polishing or grinding the work.

2. The polishing material as described in claim 1, wherein the grinding particles polarize in the presence of a magnetic field.

3. A polishing material prepared such that a fluid containing grinding particles is solidified in accordance with a surface of a work with a controlled orientation of said grinding particles in the presence of an electric field, wherein the polishing material is moved relative to said work, thereby polishing or grinding said work;

wherein the main ingredient of solvent contains at least one of the compounds represented by the following general formula,

R1—COO—R2 where R1=$C_aH_{2a+1}$,(10≦a≦25),and
where R2=$C_aH_{2a+1}$,(1≦b≦25);

wherein the grinding particles contain at least one of aluminum oxide and diamond whose particle diameter distribution has the central point at 2 to 9 μm.

4. The polishing material as described in either claims 1 or 3, wherein the fluid, containing water, solidifies by being exposed to a temperature not higher than its solidification point, and liquefies by being exposed to a temperature higher than the solidification point.

5. The polishing material as described in either claims 1 or 3, wherein the fluid, containing as a substrate a substance capable of polymerizing in the presence of light, solidifies by being exposed to light.

6. The polishing material as described in claim 5, wherein the substance capable of polymerizing is at least one arbitrarily chosen from the group comprising styrene, methyl methacrylate and vinyl acetate.

7. The polishing material as described in either claim 1 wherein:

the main ingredient of solvent contains at least one of the compounds represented by the following general formula,

R1—COO—R2 where R1=$C_aH_{2a+1}$,(10≦a≦25), and
where R2=$C_aH_{2a+1}$,(1≦b≦25).

8. The polishing material as described in either claim 7 or claim 3, wherein the main ingredient of solvent being one of stearic acid esters and myristic acid esters.

9. The polishing material as described in claim 7, wherein the grinding particles contain at least one out of aluminum oxide or diamond whose particle diameter distribution has the central point at 2 to 9 μm.

10. The polishing material as described in either claim 7 or claim 3 wherein, the grind particles contain as its main ingredient ferrite particles whose particle distribution has the central point at 2 μm or less.

11. The polishing material as described in either claim 7 or claim 3, wherein reversible phase transition of the polishing material occurs between liquid and solid states with the melting point of the solvent serving as the phase boundary.

12. A polishing material prepared such that a fluid containing grinding particles is solidified or gelatinized in accordance with the shape of a work, and the fluid turned solid or gel is moved relative to the work, thereby polishing or grinding the work;

wherein the fluid containing grinding particles is an electric rheology fluid capable of controlling the orientation of grinding particles in the presence of an electric field, and is solidified or gelatinized in the presence of an electric field.

13. A grinding particle body for abrasion-grinding wherein:

the main ingredient of solvent contains at least one of the compounds represented by the following general formula,

R1—COO—R2 where R1=$C_aH_{2a+1}$,(10≦a≦25), and
where R2=$C_aH_{2a+1}$,(1≦b≦25);

wherein the grinding particles contain at least one out of aluminum oxide or diamond whose particle diameter distribution has the central point at 2 to 9 μm.

14. A grinding particle body for abrasion-grinding wherein:

the main ingredient of solvent contains at least one of the compounds represented by the following general formula,

R1—COO—R2 where R1=$C_aH_{2a+1}$,(10≦a≦25), and
where R2=$C_aH_{2a+1}$,(1≦b≦25);

wherein the grind particle body contains as its main ingredient ferrite particles whose particle distribution has the central point at 2 μm or less.

15. A polishing material as described in claim 3, wherein the grinding particles polarize in the presence of an electric field.

* * * * *

UNITED STATES PATENT AND TRADEMARK OFFICE
CERTIFICATE OF CORRECTION

PATENT NO. : 6,547,842 B1
DATED : April 15, 2003
INVENTOR(S) : Umehara et al.

It is certified that error appears in the above-identified patent and that said Letters Patent is hereby corrected as shown below:

Column 9,
Line 26, change "10 a 25; and R2=CbH2b+1, 1 b 25." to -- $10 \leqq a \leqq 25$; and $R2=C_bH_{2b+1}$, $1 \leqq b \leqq 25$. --

Column 17,
Line 55, change "$R2=C_aH_{2a+1}$" to -- $R2=C_bH_{2b+1}$ --

Column 18,
Line 5, change "in either claim 1" to -- in claim 1 --
Lines 13, 47 and 59, change "$R2=C_aH_{2a+1}$" to -- $R2=C_bH_{2b+1}$ --

Signed and Sealed this

Ninth Day of March, 2004

JON W. DUDAS
*Acting Director of the United States Patent and Trademark Office*